United States Patent
Fangmeyer

(10) Patent No.: US 6,747,750 B1
(45) Date of Patent: Jun. 8, 2004

(54) METHOD FOR OPERATING AN ENGRAVING MEMBER

(75) Inventor: Dieter Fangmeyer, Kiel (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/555,562
(22) PCT Filed: Dec. 8, 1998
(86) PCT No.: PCT/DE98/03600
§ 371 (c)(1), (2), (4) Date: Jul. 7, 2000
(87) PCT Pub. No.: WO99/30482
PCT Pub. Date: Jun. 17, 1999

(30) Foreign Application Priority Data

Dec. 9, 1997 (DE) .......................... 197 54 379

(51) Int. Cl.⁷ .................. G06F 15/00; G06F 19/00; B23C 1/16
(52) U.S. Cl. ............. 358/1.1; 358/1.1; 358/1.3; 700/161; 700/195; 409/86; 409/91
(58) Field of Search ............. 358/1.1, 1.15, 358/1.3; 347/15–19, 43; 409/86–91; 700/159, 90, 173–175, 195, 160

(56) References Cited

U.S. PATENT DOCUMENTS

| | | |
|---|---|---|
| 5,029,011 A | 7/1991 | Fraser |
| 5,450,211 A | 9/1995 | Kanai et al. |
| 6,421,576 B1 * | 7/2002 | Sermund ............... 700/160 |
| 6,430,462 B1 * | 8/2002 | Lubcke et al. ......... 700/160 |

FOREIGN PATENT DOCUMENTS

| | | | |
|---|---|---|---|
| EP | 0 276 107 | 7/1988 | |
| EP | 0 595 324 A1 * | 5/1994 | .......... B41C/1/045 |
| EP | 0 710 550 A2 | 5/1996 | |
| EP | 0 864 430 A1 | 9/1998 | |

* cited by examiner

Primary Examiner—Kimberly Williams
Assistant Examiner—Saeid Ebrahimi
(74) Attorney, Agent, or Firm—Schiff Hardin LLP

(57) ABSTRACT

In a method for engraving a printing cylinder using an engraving member in an electronic engraving machine, an engraving tool of an engraving member controlled by an engraving signal engraves a sequence of grooves arranged in a printing screen in a rotating printing cylinder. The engraving signal is formed by superimposing an image signal representing the shade values of light and dark of the grooves to be engraved and a periodic screen signal for generating the printing screen. In order to compensate for disruptive influences on the shade values of the engraved grooves resulting from operating temperatures in the engraving member, the operating temperature in the engraving member is measured at at least one measurement point. Depending on at least one measuring temperature, the electrical control of the engraving member is corrected and/or the temperature of at least one component of the engraving member and/or the air circulating around the engraving member is modified.

17 Claims, 5 Drawing Sheets

METHOD FOR OPERATING AN ENGRAVING MEMBER

BACKGROUND OF THE INVENTION

The invention relates to the field of electronic reproduction technology and concerns a method for engraving printing cylinders using an engraving member in an electronic engraving machine for producing printing forms for gravure printing.

In an electronic engraving machine, an engraving member having a stylus as a cutting tool moves along a rotating printing cylinder in the axial direction. The stylus, which is controlled by an engraving signal, cuts a series of depressions, called steps, into the surface of the printing cylinder, which are arranged in a grid. The engraving signal is formed by superimposing an image signal representing the tone values between "light" and "dark" with a periodic grid signal. While the grid signal effectuates a vibrating stroke motion of the stylus for generating the grid, the image signal values corresponding to the tone values that are to be reproduced determine the geometric parameters such as the transverse diagonals and the longitudinal diagonals of the engraved steps.

The engraving member comprises an electromagnetic drive system for the engraving stylus, for example. The electromagnetic drive system essentially is formed of a stationary electromagnet which is charged with the engraving signal and a rotation system whose armature moves in the air gap of the electromagnet. The rotation system comprises the armature, an armature axle, an axle bearing, and a damping mechanism. One end of the armature axle is designed as a torsion bar that has been clamped in place permanently, while the other end carries a lever type stylus holder for the engraving stylus. The engraving member also comprises a mechanical slide foot and a ductor. The slide foot, which braces on the printing cylinder during engraving, provides for a defined spacing between the engraving member and the surface of the printing cylinder. The ductor removes the material that emerges during the cutting of the steps from the printing cylinder.

A magnetic electrical alternating field is generated in the electromagnet by the engraving signal. The alternating field exerts an alternating electrical torque on the armature, which is counteracted by the torque of the torsion bar. The alternating electrical torque guides the shaft out of the neutral position, which is defined by the torsion bar, by an angle of rotation that is proportional to the respective engraving signal value. With of the rotation of the shaft, the engraving stylus executes a stroke motion that is directed to the surface of the printing cylinder, which motion defines the depth of stylus penetration into the printing cylinder, and thus the geometric parameters of the engraved steps.

The magnetic alternating field in the electromagnet generates eddy current losses in the armature and in the yoke of the electromagnet, which heat the armature axle and the stylus holder with the stylus. Additional heating of the engraving member is caused by hysteresis losses in the yoke and in the armature, losses due to mechanical damping of the rotation system, and ohmic losses due to the image signal as a portion of the engraving signal.

A change in the operating temperature of the engraving member affects the depth of penetration of the stylus into the printing cylinder, and as a result incorrect tone values are engraved.

DE-A-197 22 996 teaches a method for signal processing in an electronic engraving machine in which an image signal which represents the tone values that are to be engraved and a grid signal for generating a printing grid are converted in accordance with a transfer function that is defined by transmission coefficients into an engraving signal for controlling an engraving member.

EP-A-0 595 324 teaches a method for automatically calibrating the engraving signal in an electronic engraving machine in which the engraved actual tone values are measured out and compared to predetermined desired tone values, and settings are derived from the comparison, with which the engraving signal is calibrated such that the actual tone values correspond to the desired tone values. Neither reference teaches measures for compensating the disturbing influences of temperature fluctuations in an engraving member on the tone values of the engraved steps.

SUMMARY OF THE INVENTION

It is thus the object of the present invention to improve a method for engraving printing cylinders using an engraving member in an electronic engraving machine such that disruptive influences of temperature changes in the engraving member on the engraving tone values are compensated in order to achieve a good engraving quality.

According to the method of the present invention for engraving printing cylinders using an engraving member and an electronic engraving machine, with an engraving stylus controlled by an engraving signal of an engraving member, engraving the series of steps arranged in a printing grid into a rotating printing cylinder. An image signal that represents tone values between "white" and "dark" of the steps that are to be engraved and a periodic grid signal for generating the printing grid are converted into the engraving signal in accordance with the transfer function. To compensate disturbing influences of operating temperature fluctuations of the engraving member on the tone values of the steps, operating temperature in the engraving member is measured at at least one measurement location. The engraving signal is corrected for compensating fluctuations of the operating temperature in that at least one transmission coefficient of the transfer function is modified dependent on at least one measured operating temperature.

In another embodiment of the invention, the image signal is filtered prior to being superimposed with the grid signal with the filtered signal being used as the engraving signal. An operating temperature in the engraving member is measured at at least one measurement location. For compensating fluctuations and operating temperature, the engraving signal is corrected by modifying a filter function dependent on at least one measured operating temperature.

In a further embodiment of the invention, an operating temperature in the engraving member is measured at at least one measurement location, and at least one of temperature of at least one component of the engraving member and of air surrounding the engraving member is modified dependent on at least one measured operating temperature.

The invention is detailed below with the aid of FIG. 1 to FIG. 5.

Shown are:

Figure 1:
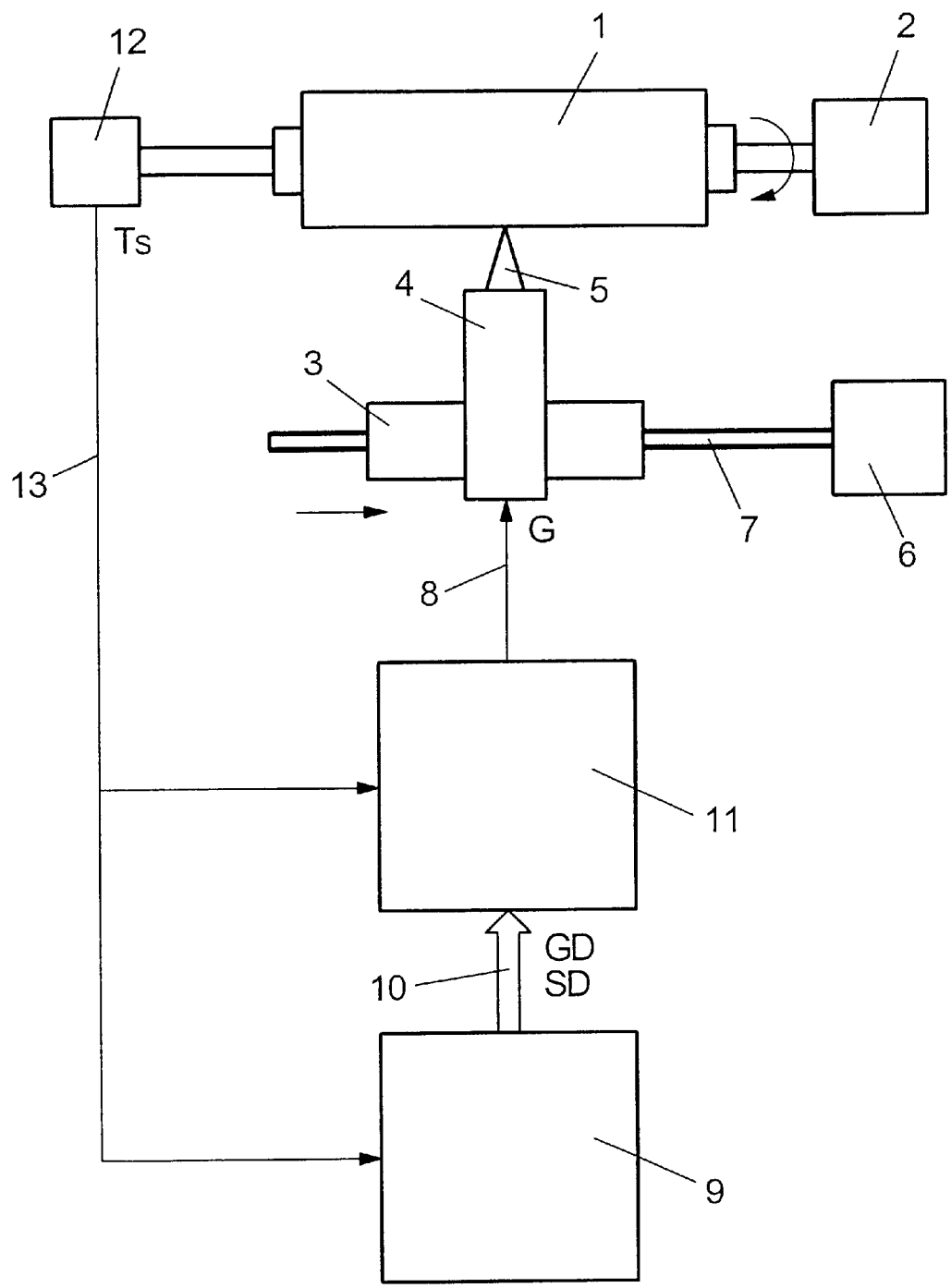
FIG. 1 is—a basic block circuit diagram of an engraving machine for engraving printing cylinders.

FIG. 1 is a basic block circuit diagram of an engraving machine for engraving printing cylinders. A printing cylinder 1 is driven in a rotatory manner by a rotation drive 2. An engraving member 4 that is mounted on an engraving carriage 3, which has an engraving stylus 5 as a cutting tool, moves along the rotating printing cylinder 1 in the axial direction with the aid of a spindle 7 which is driven by a feed drive.

The stylus 5 of the engraving member 4, which is controlled by an analog engraving signal G on a line 8, cuts a series of steps which are arranged in a printing grid into the surface of the rotating printing cylinder 1 line by line, while the engraving carriage 3 with the engraving member 4 moves along the printing cylinder 1 axially. The engraving member 4 is designed as an engraving member having an electromagnetic drive for the engraving stylus 5, for example. The engraving member can also have a piezoelectric or magnetostrictive drive, however.

While a periodic grid signal effectuates a vibrating stroke motion of the engraving stylus 5 for generating the printing grid, engraving data GD, as image signal values corresponding to the tone values between "light" and "depth" that are to be engraved, determine the geometric parameters such as cross-diagonals and longitudinal diagonals of the steps that are engraved by the stylus 5.

In an engraving data computer 9, the engraving data GD are generated engraving line by engraving line, and control data SD for signal conditioning are also readied. Engraving data GD and control data SD are delivered via a data bus 10 to a signal processing stage 11, in which the engraving signal G for the engraving member 4 is generated.

To synchronize the signal processing with the rotational movement of the printing cylinder 1, a pulse generator 12 is mechanically coupled to the printing cylinder 1. The pulse generator 12 generates a synchronization clock pulse sequence $T_S$, which is sent to the engraving computer 9 and the signal conditioning stage 11 via a line 13.

Figure 2:
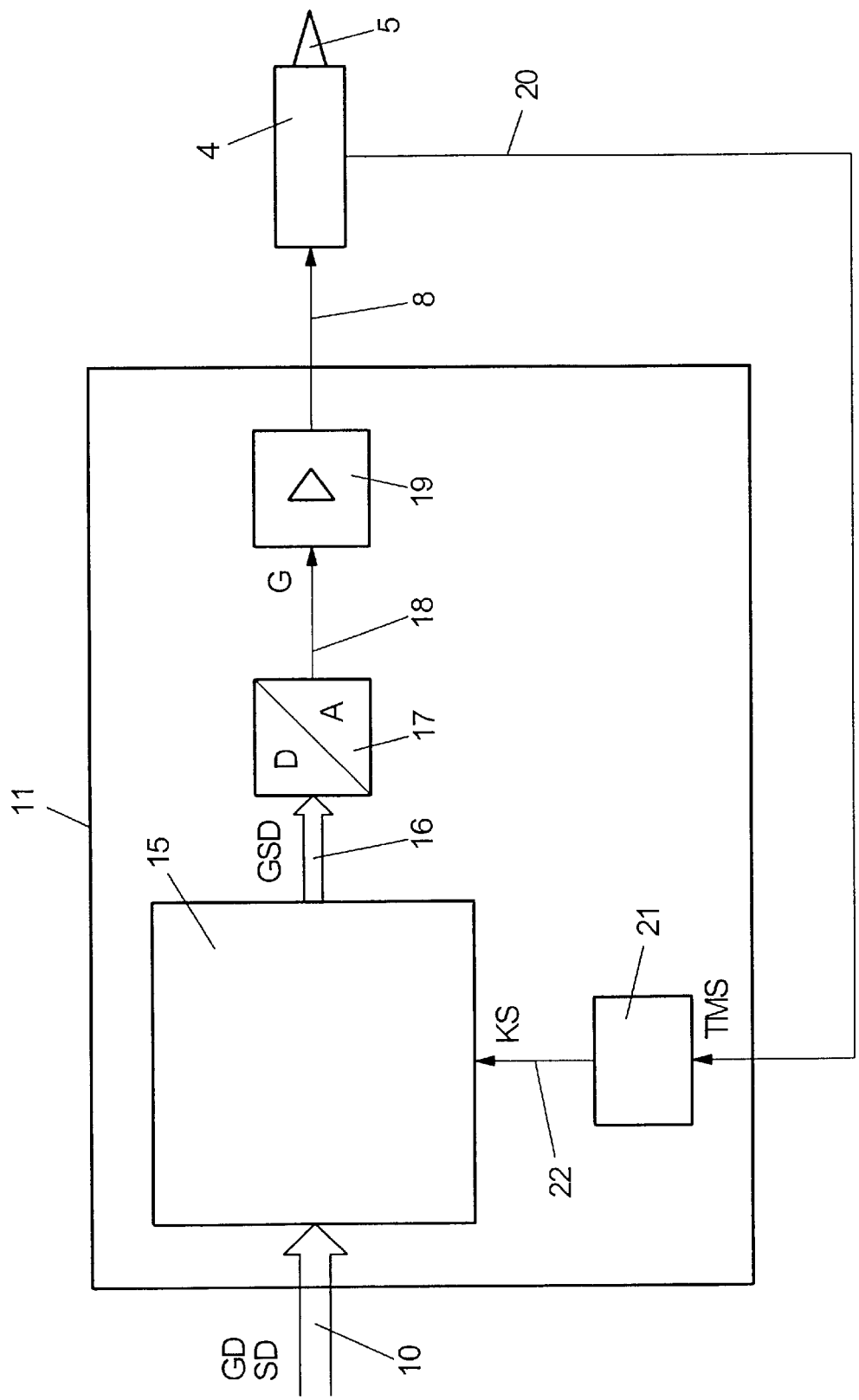
FIG. 2 is—an exemplary embodiment of a signal conditioning stage.

FIG. 2 shows an exemplifying embodiment of the signal conditioning stage 11.

In the signal conditioning stage 11, the engraving data GD and the control data SD are transferred to a signal processor 15 via the data bus 10. In the signal processor 15, the periodic grid signal for generating the printing grid is calculated from stored function value data FD. Furthermore, in the signal processor, 15 correction data KD for correcting the cut depth of the engraving signal G, and settings ($EP_{light}$, $EP_{dark}$) for the tone values "light" and "depth" are stored in addressable form in a look-up table (LUT).

In the signal processor 15 the engraving data (GD) are numerically converted into engraving control data GSD in accordance with the following transfer function:

$$GSD = (GD \times k_1 + KD \times k_2) \times (EP_{light} \times k_4) + EP_{dark} \times k_5 + FD \times k_3$$

Where:

GD=engraving data (input data)

GSD =engraving control data (output data)

$EP_{light}$=setting for tone value "light"

$EP_{dark}$=setting for tone value "depth"

FD=function value data

KD=correction data, and $k_x$=transmission coefficient

The engraving control data GSD outputted by the signal processor 15 reach a D/A converter 17 via a data bus 16, which converter generates the analog engraving signal G on a line 18. The analog engraving signal G is then amplified in a downstream analog engraving amplifier 19 and output to the engraving member 4 via the line 8.

The signal 15 and the engraving amplifier 9 are preferably constructed in accordance with the German patent application P 197 22 996.4.

In order to compensate the disturbing influences of the changes in operating temperature in the engraving member 4 on the geometric parameters, and thus on the tone values, of the engraved steps, the operating temperature of the engraving member 4 is continuously measured at at least one measurement point, and the engraving signal G is corrected depending on the measured operating temperature, and/or at least one component of the engraving member 4 or the air surrounding the engraving member 4 is heated or cooled.

The temperature behavior of the engraving member 4 is not determined merely by the operating temperature at an individual location, but by the heat distribution to various critical locations of the engraving member 4, this distribution being dependent on several factors, such as the values of the engraving signal G. In order to acquire the heat distribution in the engraving member 4 optimally effectively, the operating temperature is advantageously measured at several select measurement locations in the engraving member 4 using appropriate temperature sensors. For example, a respective temperature sensor is attached to the damping mechanism, to the armature of the rotation system, to the slide foot, and to the housing of the engraving member 4, since, among other things, the operating temperature at the damping mechanism influences the dynamic behavior of the engraving stylus 5, and the operating temperature of the armature, the slide foot and the housing influence the engraved depth of the steps. For an engraving member having a piezoelectric or magnetostrictive actuator, it may be advantageous to measure the operating temperature of the actuator itself or at a lever transmission between actuator and engraving stylus.

The operating temperatures T measured at the engraving member 4 are delivered as temperature measurement signals TMS to an evaluation stage 21 in the signal processing stage 11 via a multiple line, which transfer of temperature measurement signals TMS can occur in time intervals, for example. In the evaluation stage 21, temperature-dependent correction signals KS for compensating the disturbing temperature effects are formed from the delivered temperature measurement signals TMS, and these signals are delivered to the signal processor 15 via a multiple line 22.

In a first example, the influence of temperature changes in the engraving member 4 on the tone values of the engraving steps, specifically on the engraved depths of steps, which represent the tone value "depth", is compensated by correcting the engraving signal G using the temperature-dependent correction signals KS.

Figure 3:
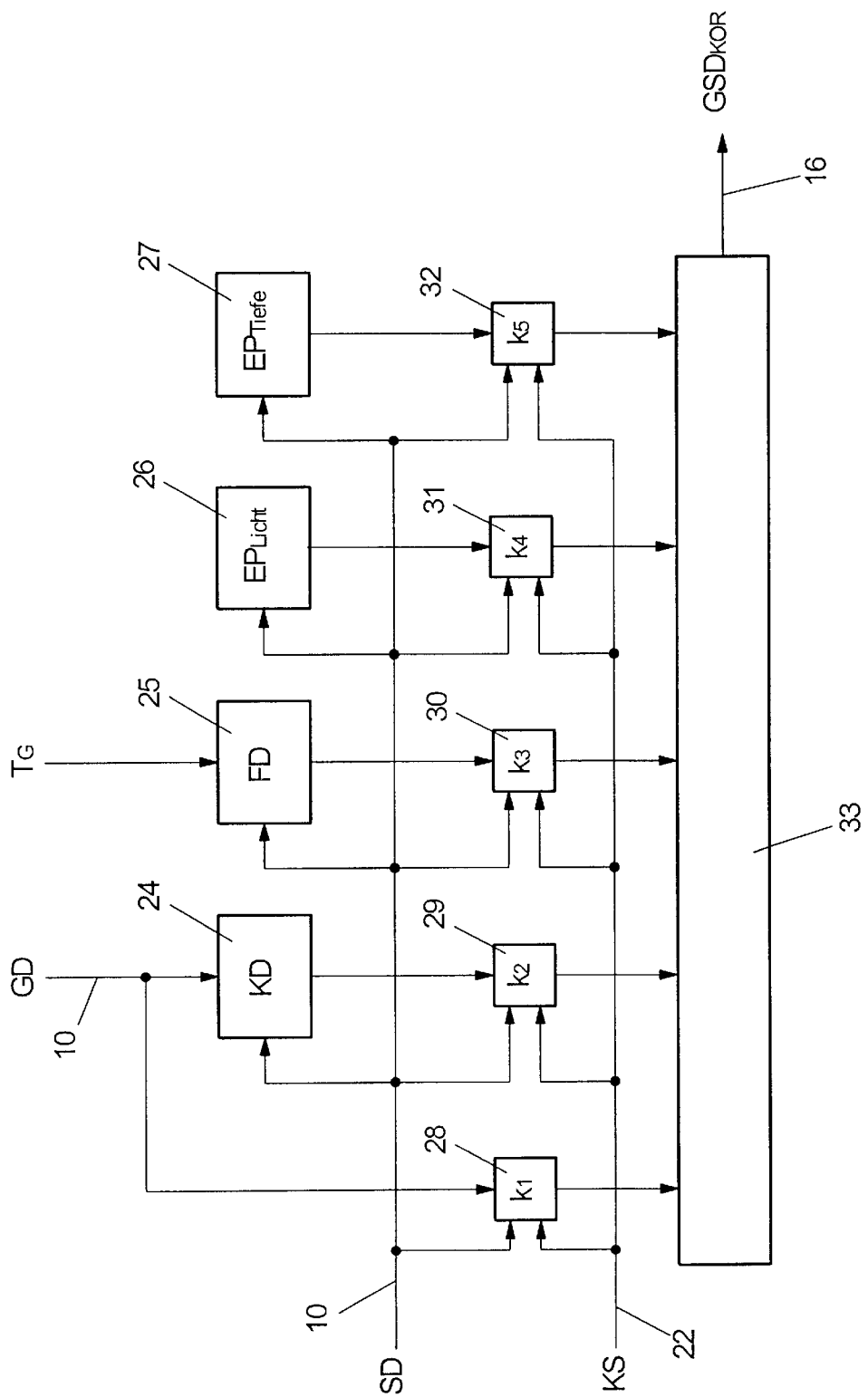
FIG. 3 shows—an exemplary embodiment of a signal processor for correcting the engraving signal.

FIG. 3 shows a corresponding exemplifying embodiment of the signal processor 15 for the temperature-dependent correction of the engraving signal G. The signal processor 15 comprises two table storage units 24,25 and two parameter storage units 26,27. In the first table storage unit 24, the correction value table KD=f(GD) for cut depth correction is loaded, and in the second table storage unit 25, a function value table FD=f($T_G$) for generating the grid signal is loaded. The parameter storage units 26,27 contain the settings $EP_{light}$ and $EP_{depth}$ for calibrating the tone values "light" and "dark".

The first table storage unit 24 is addressed by the engraving data GD. The function value data FD are read from the second table storage unit 25 by an engraving clock pulse sequence $T_G$. The settings $EP_{light}$ and $EP_{dark}$ that are needed for calibration are called by the control data SD. The engraving data GD on the data bus 10 and the quantities that are read from the respective memories 24,25,26,27 are weighted in multiplication stages 28,29,30,31,32 with the transmission coefficients $k_x$ that are stored there. The weighted quantities are fed to a computer 33, in which the engraving control data GSD are computed in accordance with the transfer function as follows:

$$GSD=(GD \times k_1+KD \times k_2) \times (EP_{light} \times k_4)+EP_{dark} \times k_5+FD \times k_3$$

For the temperature-dependent correction of the engraving control data GSD, at least one of the transmission coefficients $k_x$ in the above transfer function is modified by the correction signals KS on the line 22 or by selectable portions thereof, and the corrected engraving control data $GSD_{KOR}$ are converted into the engraving signal G for actuating the engraving member 4.

In a practical example of application, the operating temperature $T_1$ of the damping mechanism and the operating temperature $T_2$ of the slide foot are transferred as temperature measurement signals $TMS_1$ and $TMS_2$ to an evaluation stage 21, where temperature-dependent correction signals KS are formed from temperature measurement signals $TMS_1$ and $TMS_2$.

A first correction signal $KS_1$ is formed in accordance with the equation $KS_1=f_{T1} \times \Delta T$ from the temperature difference $\Delta T$ between the operating temperature $T_1$ of the damping mechanism and the operating temperature $T_2$ of the slide foot, as well as from a selectable first temperature factor $f_{T1}$. A second correction signal $KS_2$ is generated from the operating temperature $T_1$ of the damping mechanism and a selectable second temperature factor $f_{T2}$ in accordance with the equation $KS_2=f_{T2} \times T_1$.

In the signal processor 15 for temperature-dependent correction of the cut dark for the tone value "dark" the transmission coefficient $k_5$ in the abovementioned transfer function is then modified by the correction signal $KS_1$, and for temperature-dependent correction of the grid signal, the transmission coefficient $k_3$ is modified by the correction signal $KS_2$.

In a second example, the influence of temperature changes in the engraving member 4 on the tone values of the engraved steps is compensated by correcting the filter coefficients of a digital correction filter in the signal path of the engraving data GD using a temperature-dependent correction signal KS. Such digital correction filters are employed to minimize disturbing effects of an electromagnetic engraving member such as the drag effect and bounce effect.

Figure 4:
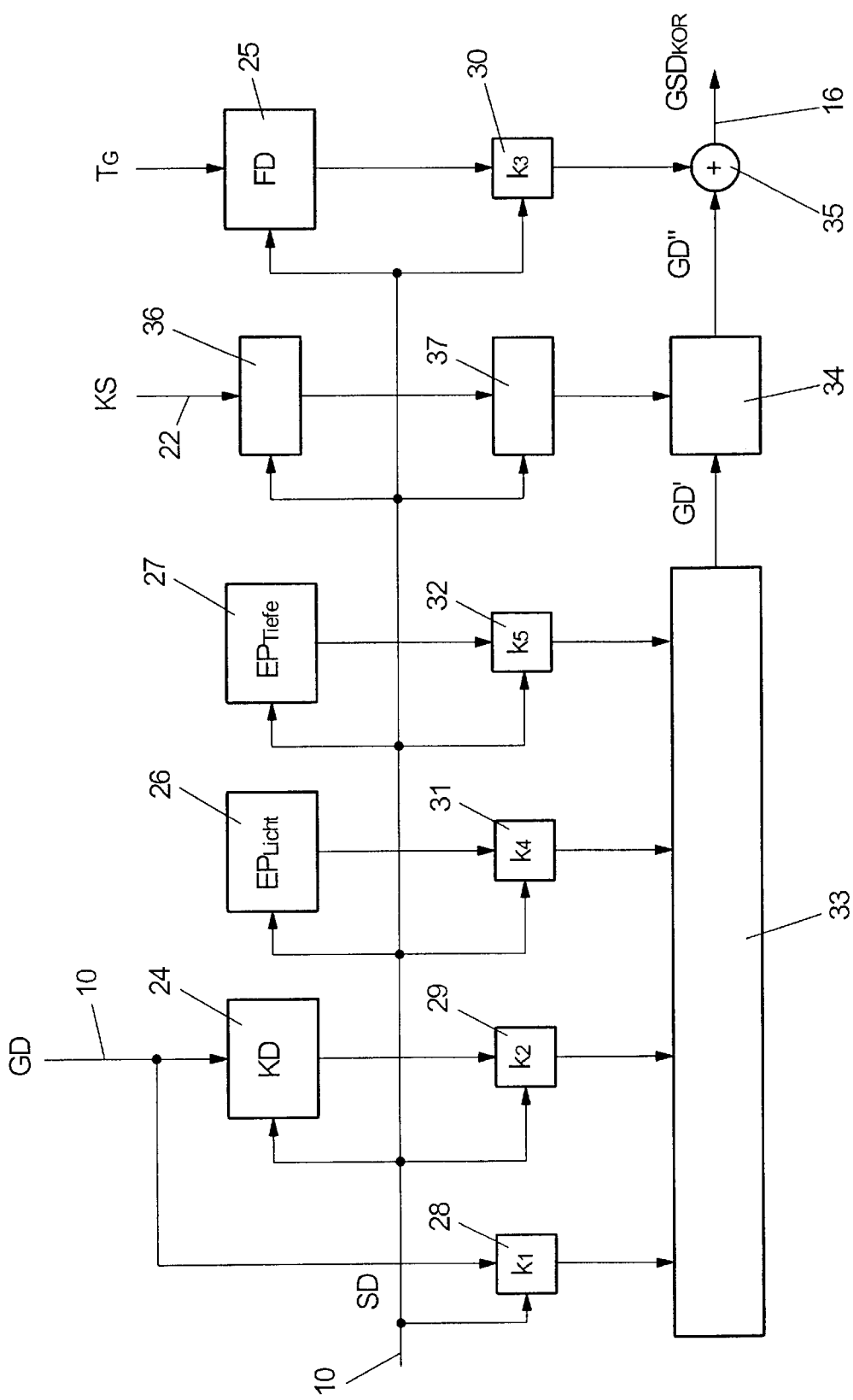
FIG. 4 shows—an exemplary embodiment of a signal processor for correcting the filter coefficients of a correction filter.

FIG. 4 shows a corresponding exemplifying embodiment of the signal processor 15 for the temperature-dependent correction of the filter coefficients of a digital correction filter. The signal processor 15 in FIG. 4 differs from the signal processor 15 in FIG. 3 by a digital correction filter 34 and a downstream adder 35 in the signal path of the engraving data GD.

In the computer 33, the engraving data GD are first modified in accordance with equation I.

$$GD'=(GD \times k_1+KD \times k_2) \times (EP_{light} \times k_4)+EP_{dark} \times k_5 \qquad (I)$$

The modified engraving data GD' are fed to the correction filter 34. In the correction filter 34, for linear compensation of the disturbing influences of the engraving element 4 such as bounce and drag effects, the modified engraving data (GD') undergo a digital filtering in accordance with a filtering function with statistical filter coefficients $a_n$ and $b_n$, in order to obtain the corrected and filtered engraving data GD".

The filter coefficients $a_n$ and $b_n$ are calculated in a coefficient computer 36 and transferred into a coefficient storage unit 37, from which they are input into the correction filter 34. The calculation of the required filter coefficients $a_n$ and $b_n$ is carried out with the aid of calculation parameters, which are fed to the coefficient computer 36 via the control data SD.

For the temperature-dependent correction of the filter coefficients $a_n$ and $b_n$, the corresponding correction signal KS—preferably the second correction signal $KS_2$, which is derived from the operating temperature $T_1$ of the damping mechanism—is fed to the coefficient computer 36, thereby compensating temperature-dependent fluctuations of the damping characteristics by exerting influence on the bounce and drag of the engraving member 4 in the engraving signal G.

The corrected engraving control data $GDS_{KOR}$ are then obtained by addition in accordance with equation (II):

$$GDS_{KOR}=GD''+FD \times k_3 \qquad (II)$$

The signal processor 15 with the digital correction filter 34 is preferably designed in accordance with the German patent application P 197 23 002.4.

In a third example, the influence of temperature changes in the engraving member 4 on the tone values of the engraved steps is compensated by heating or cooling components of the engraving member 4 or the air surrounding the engraving member 4 depending on the operating temperatures that are measured in the engraving member. Here, the heating and/or cooling can occur to a defined temperature or to a defined temperature difference relative to the environmental temperature. This example can be applied particularly when it is a requirement that the operating temperature of the damping mechanism of the engraving member 4 be kept constant. In this way, temperature fluctuations at those elements of the engraving member which cause the disturbing effects on the quality of engraving are advantageously reduced. A further advantage of an air cooling of the engraving member 4 is that at the start of engraving the engraving member 4 assumes a stable operative state more rapidly, since the heat transport is better through flowing air than through a heat conduction in metal.

Figure 5:
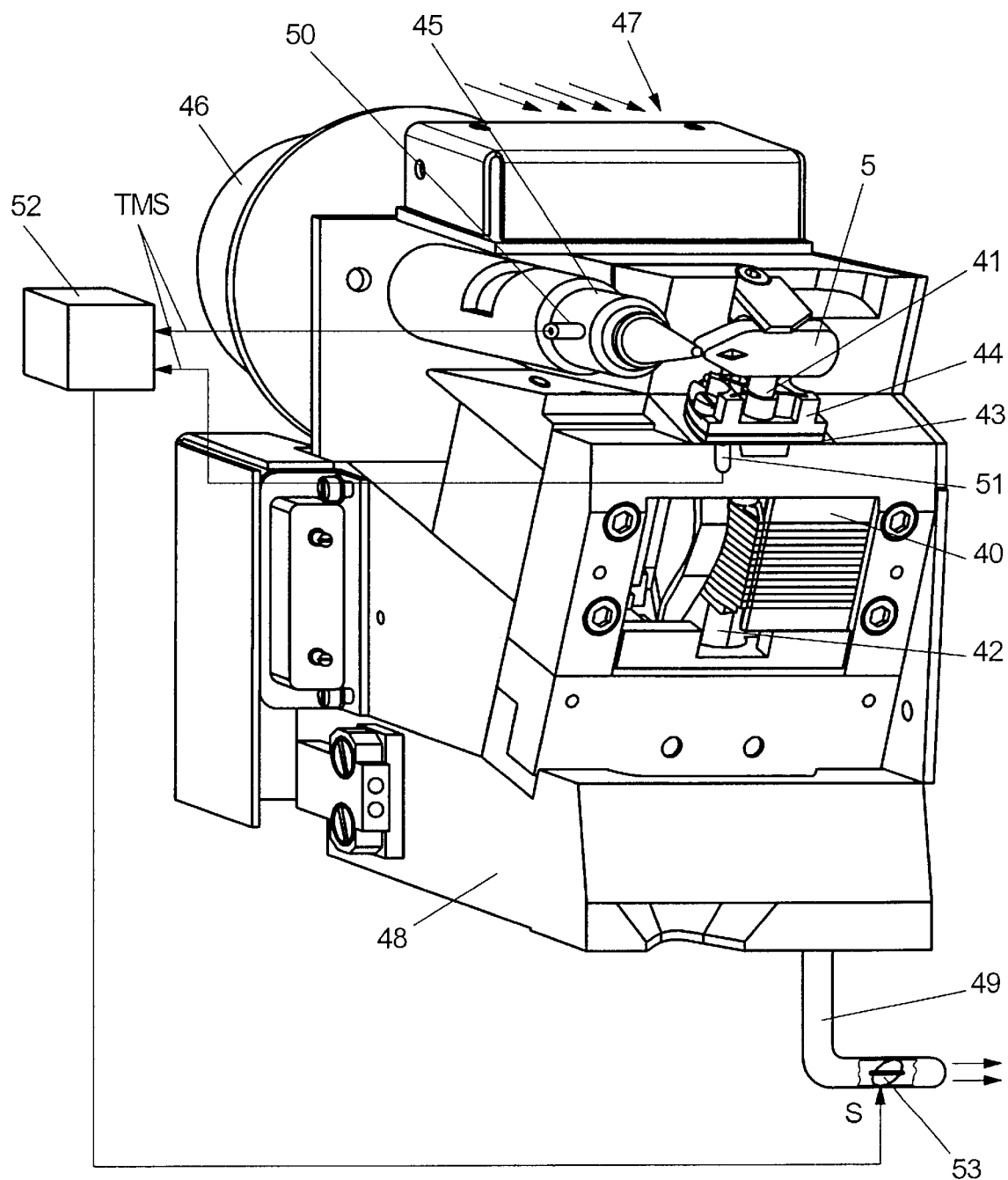
FIG. 5 is—a perspective representation of an engraving member.

FIG. 5 shows a perspective view of the engraving member 4 with the electromagnetic drive system 40 and the rotation system, which consists essentially of a shaft 41, a torsion bar 42, a damping mechanism 43, a torsion spring hanger 44, and the engraving stylus 5. Furthermore, a slide foot 45 is illustrated, which can be displaced axially by a turning knob 46, in order to vary and fix the spacing between the engraving stylus 5 and the surface of the printing cylinder 1.

For cooling the components of the engraving member 4, air enters through an entry window 47 in the housing of said member 5 that is located at the (back of the engraving member 4, and the heated air is exhausted through an air channel located in a baseplate 48.

For measuring the operating temperature of the engraving member 4, temperature sensors 50,51 are attached to the slide foot 45 and the damping mechanism 43, the temperature measurement signals TMS of which are sent to a control stage 52. In the control stage 52, a control signal S is generated depending on the temperature measurement signals TMS. In the illustrated exemplary embodiment, the control signal S actuates a throttle valve 53 in the air channel 49 in order to influence the airflow through the engraving member 4.

In a development hereof, the temperature of the air surrounding the engraving member 4 can be modified by cooling and/or heating elements which are controllable by the control signal S. In another development, cooling and/or heating elements that can likewise be controlled by the control signal S are attached directly to the relevant components of the engraving member 4. In another development, the engraving member 4 can be heated prior to engraving and/or during interruptions in engraving by an auxiliary signal flowing through the engraving element 4 or by means of a heating coil.

Although various minor changes and modifications might be proposed by those skilled in the art, it will be understood that my wish is to include within the claims of the patent warranted hereon all such changes and modifications as reasonably come within my contribution to the art.

I claim:

1. A method for engraving printing cylinders using an engraving member in an electronic engraving machine, comprising the steps of:

with an engraving stylus controlled by an engraving signal of an engraving member engraving a series of steps arranged in a printing grid into a rotating printing cylinder;

converting an image signal that represents tone values between "light" and "dark" of the steps that are to be engraved and a periodic grid signal for generating the printing grid into the engraving signal in accordance with a transfer function; and to compensate disturbing influences of operating temperature fluctuations of the engraving member on the tone values of the steps measuring operating temperature in the engraving member at at least one measurement location; and correcting the engraving signal for compensating fluctuations of the operating temperature by modifying at least one transmission coefficient of the transfer function dependent on at least one measured operating temperature.

2. The method of claim 1 wherein the image signal and grid signal are converted in accordance with the transfer function upon consideration of settings for the tone values "light" and "dark" utilized for calibration; and the transmission coefficient allocated to the setting is modified dependent on at least one measured operating temperature.

3. The method of claim 1 wherein the operating temperature is measured at a damping mechanism of the engraving member.

4. The method of claim 1 wherein the operating temperature is measured at a slide foot of the engraving member.

5. The method of claim 1 wherein the operating temperature of the damping mechanism and the operating temperature of the slide foot of the engraving member are measured;

a correction signal is formed from a difference of the measured operating temperatures; and the transmission coefficient of the transfer function allocated to a setting for the tone value "dark" is modified by the correction signal.

6. The method of claim 1 wherein the operating temperature of the damping mechanism of the engraving member is measured;

a correction signal is formed from the measured operating temperature; and the transmission coefficient of the transfer function allocated to the grid signal is modified by the correction signal.

7. The method of claim 1 wherein the image signal is present as engraving data, and the grid signal is present as function value data;

the operating temperature of the damping mechanism of the engraving member is measured;

a correction signal is formed from the measured operating temperature; and the transmission coefficient allocated to the function value data is modified by the correction signal.

8. The method of claim 1 wherein the image signal is present as engraving data GD, and the grid signal is present as function value data FD; and the engraving data GD, the function value data FD and the settings $EP_{light}$, $EP_{dark}$ for the tone values "light" and "depth" are converted in accordance with the transfer function $G=(GD \times k_1 \times EP_{light} \times k_4) + EP_{dark} \times k_5 + FD \times k_3$, where $k_1$, $k_3$, $k_4$, and $k_5$ are transmission coefficients.

9. A method for engraving printing cylinders by an engraving member in an electronic engraving machine, comprising the steps of:

with an engraving stylus controlled by an engraving signal of an engraving member, engraving a series of steps arranged in a printing grid into a rotating printing cylinder;

forming the engraving signal by superimposing an image signal representing tone values between "light" and "dark" of steps that are to be engraved with a periodic grid signal for generating the printing grid; and to compensate disturbing influences of operating temperature fluctuations of the engraving member on the tone values of the steps filtering the image signal prior to being superimposed with the grid signal, and using the filtered signal as the engraving signal;

measuring an operating temperature in the engraving member at at least one measurement location; and for compensating fluctuations in operating temperature, correcting the engraving signal by modifying a filtering function dependent on at least one measured operating temperature.

10. The method of claim 9 wherein the image signal is present as engraving data, and the grid signal is present as function value data;

the engraving data undergo a digital filtering process in accordance with the filtering function defined by filter coefficients prior to being superimposed with the function value data; and at least one filter coefficient is corrected dependent on at least one measured operating temperature.

11. The method of claim 9 wherein a digital filtering of the engraving data is carried out using a digital FIR correction filter of at least second order.

12. The method of claim 9 wherein a digital filtering of the engraving data is carried out using a digital IIR correction filter of at least second order.

13. A method for engraving printing cylinders by means of an engraving member in an electronic engraving machine, comprising the steps of:

with an engraving stylus controlled by an engraving signal of an engraving member engraving a series of steps which are arranged in a printing grid into a rotating printing cylinder;

forming the engraving signal by superimposing an image signal representing tone values between "light" and "dark" of the steps that are to be engraved with a periodic grid signal for generating the printing grid;

to compensate disturbing influences of operating temperature fluctuations of the engraving member on the tone values of the steps measuring an operating temperature in the engraving member at at least one measurement location; and modifying at least one of a temperature of at least one component of the engraving member and of air surrounding the engraving member dependent on the at least one measured operating temperature.

14. The method of claim 13 wherein the temperature of the components and/or of the air is modified by cooling or heating.

15. The method of claim 13 wherein the temperature of the components of the engraving member is modified by a cooling and/or heating element controlled dependent on at least one measured operating temperature.

16. The method of claim 13 wherein air surrounding the engraving member is fed in and out in an air channel; and the temperature of the air is modified by a throttle valve in the air channel controlled dependent on at least one measured operating temperature.

17. A method for engraving printing cylinders with an engraving member in an electronic engraving machine, comprising the steps of:

with an engraving stylus controlled by an engraving signal of an engraving member engraving a series of steps into a rotating printing cylinder;

forming the engraving signal by superimposing an image signal representing tone values between "light" and "dark" of the steps that are to be engraved with a periodic grid signal;

to compensate disturbing influences of operating temperature fluctuations of the engraving member on the tone values of the steps measuring an operating temperature at the engraving member at at least one measurement location; and modifying at least one of a temperature of at least one component of the engraving member and of air surrounding the engraving member dependent on the at least one measured operating temperature.

* * * * *